US012699811B2

(12) United States Patent
Manceron et al.

(10) Patent No.: US 12,699,811 B2
(45) Date of Patent: Aug. 4, 2026

(54) COMPUTER-IMPLEMENTED METHOD FOR THE SECURE PREPARATION OF A PROPERTY TRANSFER DOCUMENT

(71) Applicant: PROOV GROUP, Neuilly-sur-Seine (FR)

(72) Inventors: Jean-Luc Cédric Manceron, Neuilly-sur-Seine (FR); Gabriel Pierre Maxime Tissandier, Neuilly-sur-Seine (FR); Alexandre Perret-Meyer, Neuilly-sur-Seine (FR)

(73) Assignee: PROOV GROUP (FR)

( * ) Notice: Subject to any disclaimer, the term of this patent is extended or adjusted under 35 U.S.C. 154(b) by 215 days.

(21) Appl. No.: 17/770,157

(22) PCT Filed: Oct. 29, 2020

(86) PCT No.: PCT/EP2020/080439
§ 371 (c)(1),
(2) Date: Apr. 19, 2022

(87) PCT Pub. No.: WO2021/084026
PCT Pub. Date: May 6, 2021

(65) Prior Publication Data
US 2022/0391542 A1 Dec. 8, 2022

(30) Foreign Application Priority Data

Oct. 31, 2019 (EP) ..................................... 19206481

(51) Int. Cl.
*G06F 21/64* (2013.01)
*H04L 9/00* (2022.01)
*H04L 9/08* (2006.01)

(52) U.S. Cl.
CPC ............ *G06F 21/64* (2013.01); *H04L 9/0861* (2013.01); *H04L 9/50* (2022.05)

(58) Field of Classification Search
None
See application file for complete search history.

(56) References Cited

U.S. PATENT DOCUMENTS

| 11,062,042 | B1 * | 7/2021 | McKervey | ............ | G06F 16/137 |
| 11,501,365 | B1 * | 11/2022 | Awasthy | ................. | H04L 63/04 |
| 2005/0144018 | A9 * | 6/2005 | Aptekar | ................. | G06Q 10/08 |
| | | | | | 705/307 |

(Continued)

FOREIGN PATENT DOCUMENTS

CN      107659410      2/2018

OTHER PUBLICATIONS

International Search Report mailed Nov. 18, 2020 in corresponding PCT International Application No. PCT/EP2020/080439.

(Continued)

*Primary Examiner* — Trang T Doan
(74) *Attorney, Agent, or Firm* — OSTROLENK FABER LLP

(57) ABSTRACT

Computer-implemented method for preparing a property transfer document, that includes a step of acquiring a plurality of data entered by a user; a step of creating an entry log; a step of computing a final security key; a storing step; and a step of digitally publishing a property transfer document according to the acquired data.

8 Claims, 2 Drawing Sheets

(56) References Cited

U.S. PATENT DOCUMENTS

| | | | |
|---|---|---|---|
| 2015/0312227 A1* | 10/2015 | Follis | H04L 9/3247 |
| | | | 713/176 |
| 2016/0149707 A1* | 5/2016 | Follis | G06Q 10/00 |
| | | | 713/176 |
| 2017/0220815 A1* | 8/2017 | Ansari | G06Q 10/06 |
| 2018/0052813 A1 | 2/2018 | Lauprete et al. | |
| 2018/0144125 A1* | 5/2018 | Frank | G06F 11/3006 |
| 2018/0191503 A1* | 7/2018 | Alwar | G06Q 20/065 |
| 2018/0329693 A1* | 11/2018 | Eksten | G06F 8/65 |
| 2019/0166101 A1* | 5/2019 | Ramos | H04L 9/3239 |
| 2019/0207767 A1* | 7/2019 | Ahn | H04L 9/3236 |
| 2019/0386833 A1* | 12/2019 | Alger | H04L 9/3239 |
| 2020/0007343 A1* | 1/2020 | Evans | H04L 9/0643 |
| 2020/0051188 A1* | 2/2020 | Chopra | G06Q 40/04 |
| 2020/0106602 A1* | 4/2020 | Santos | H04L 9/3239 |
| 2020/0143267 A1* | 5/2020 | Gidney | H04L 9/3239 |
| 2020/0412524 A1* | 12/2020 | Das | G06F 16/1824 |
| 2021/0042839 A1* | 2/2021 | Adamec | H04L 9/3239 |
| 2022/0189589 A1* | 6/2022 | Ogawa | G16H 50/30 |

OTHER PUBLICATIONS

Written Opinion mailed Nov. 18, 2020 in corresponding PCT International Application No. PCT/EP2020/080439.

\* cited by examiner

COMPUTER-IMPLEMENTED METHOD FOR THE SECURE PREPARATION OF A PROPERTY TRANSFER DOCUMENT

CROSS-REFERENCE TO RELATED APPLICATIONS

The present application is a 35 U.S.C. §§ 371 national stage application of PCT/EP2020/080439, filed Oct. 29, 2020, which claims priority to European Patent Application No. 19206481.4, filed Oct. 31, 2019, the contents of which are incorporated herein by reference. The PCT International Application was published in the French language.

TECHNICAL FIELD

The invention relates to a computer-implemented method for the secure preparation of a property transfer document.

In particular, the invention relates to the secure preparation of a condition sheet for a rental property when picking up and/or returning the property, in particular for the rental of a motor vehicle.

However, the invention is not only limited to the rental field, and it also applies to the related fields of insurance— report before taking out the policy and making a claim— within the context of the management of motor vehicle fleets by companies/agencies, and at the end of the production line for manufacturers to identify defects and/or faults in new vehicles.

The method according to the invention may also be used in different general fields such as real estate rental.

BACKGROUND OF THE INVENTION

In the field of motor vehicle rental, and more generally in the field of property rental, the preparation of a condition sheet, also called a report or inventory, is necessary both when taking on the property and when returning, in order to certify the condition of the property when transferring responsibility.

These inventories usually take the form of separate reports made by the renter and the owner, who note on a physical document, generally a sheet of paper, the state of wear of and any damage present on the property to be rented or on the property to be returned; the document is then signed by both parties.

The introduction of digital technologies has given rise to the possibility of digital reports, for which the paper document is replaced with an electronic form, completed by one of the two parties in the two-part inventory process.

However, known digital inventory solutions do not afford the obtained document sufficient security.

Specifically, the stored information is generally falsifiable later on, relatively undetectably, which creates a legal risk in the preparation of such reports.

For this reason, there is a need for a secure and reliable method for the preparation of a property transfer document, such as a rental property, in particular a motor vehicle.

SUMMARY OF THE INVENTION

To that end, a computer-implemented method for preparing a property transfer document is proposed, comprising:
  the acquisition of a plurality of data entered by a user, each acquired datum corresponding to an item of information on said document; said data being entered one after the other by said user;

the creation of an entry log forming a chronological sequence of the entry of the data by said user;
  a step of computing a final security key on the basis of said data entered by said user;
  a step of storing said acquired data, said entry log and said security key; and
  a step of digitally publishing a property transfer document according to said acquired data.

Thus, a property transfer document, also called a report, may be edited securely by associating this document with security data capable of authenticating the content thereof.

Advantageously and in a non-limiting manner, the method comprises, after the entry step, a step of constituting a first security key log such that, for each entry in the entry log, the first security key log comprises a key computed on the basis of said entry. Thus, it is possible to obtain a data log and a log of associated security keys such that each security key allows the authenticity of each associated datum in the data log to be verified.

Advantageously and in a non-limiting manner, the method further comprises an incremental security key computing step in which a first key is computed during the acquisition of a first datum entered by said user and, for each acquisition of a subsequent datum entered by the user, a subsequent security key is computed on the basis of said entered datum and of the preceding security key. Thus, a final security key may be obtained incrementally, in other words obtained while taking all of the acquired data into account.

Advantageously and in a non-limiting manner, said security keys computed in the incremental security key computing step are stored in a sequential manner so as to form an incremental security key log. Thus, it is possible to track all of the incrementally computed keys, which improves the ability to detect a potential discrepancy between the stored data and a previously prepared report.

Advantageously and in a non-limiting manner, at least said final security key is stored in a decentralized manner, in particular in a blockchain. Thus, the security of the storage of the security key may be improved.

Advantageously and in a non-limiting manner, the acquisition step comprises the acquisition of at least one item of multimedia content, such as a digital image or a digital video, each associated with a distinct fingerprint computed by way of a fingerprint computation distinct from the other acquired data and/or stored in a multimedia content fingerprint log distinct from the other acquired data. Thus, it is possible to authenticate and secure the acquisition of multimedia content relatively simply and quickly when creating a secure report.

The invention also relates to a computer-implemented method for verifying the authenticity of a document prepared by means of said method described above, comprising:
  the acquisition of a set of stored data, of an associated security key and of an associated entry log;
  the computation of a second security key on the basis of said associated entry log and of said stored data;
  the comparison between the associated security key and the second security key and if the two keys are identical, said document is authentic.

Thus, the validity of a report created using the preparation method described above may be determined with certainty.

In this way, the invention solves the stated problem by advantageously combining the two claimed methods, firstly by creating a report associated with authentication data and a security key and secondly by verifying this report using the stored data.

The invention also relates to a data-processing device, such as a server, a personal computer, a telephone, a tablet, or any other device, comprising means for implementing the steps of the preparation method as described above and/or the steps of the verification method described above.

The invention also relates to a computer program comprising instructions which, when the program is executed by a computer, results in the latter implementing the steps of the preparation method described above and/or the steps of the verification method as described above.

The invention also relates to a computer-readable data storage medium, such as a hard disk, a CD-ROM, a DVD-ROM, a flash memory, a ROM, and any other medium known to a person skilled in the art, on which the one or more computer programs described above are stored.

BRIEF DESCRIPTION OF THE DRAWINGS

Other features and advantages of the invention will become apparent from reading the description provided below of one particular embodiment of the invention, which is given by way of non-limiting indication and with reference to the appended drawings, in which.

DESCRIPTION OF PREFERRED EMBODIMENTS

According to a first embodiment of the invention, a device such as a computer, a server providing an input interface, or any other mobile computing device such as a smartphone or a tablet computer, implements a method for the secure preparation of a property transfer document.

In the context of this invention, what is meant by a property transfer document is any inventory document, document regarding the condition of any movable or immovable property, or any other report, by both parties or otherwise, for establishing the condition of a property on a certain date.

Such a document, referred to interchangeably in the rest of the description as a report or inventory, thus comprises a succession of text and visual data, such as images and videos. Any other type of digital data may be included, such as digital documents or digitized sounds, depending on the field or property to which the report applies.

The invention may therefore be applied to any movable or immovable property, and to any associated activity such as real estate rental, car rental or rental of any other property, conveyancing, provisioning, security, logistics, insurance, etc.

Figure 1:
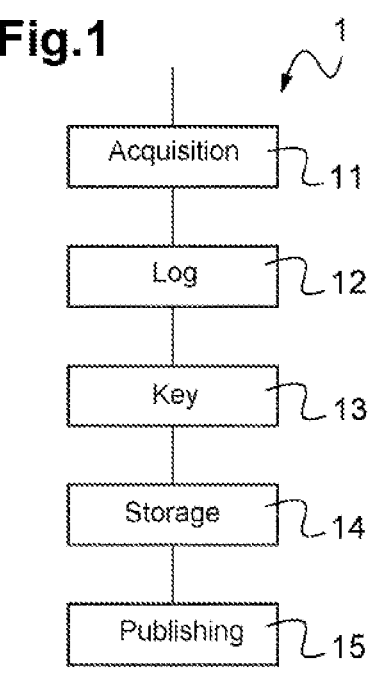
FIG. 1 is a flowchart of a method for preparing a property transfer document according to one embodiment of the invention.
Figure 2:
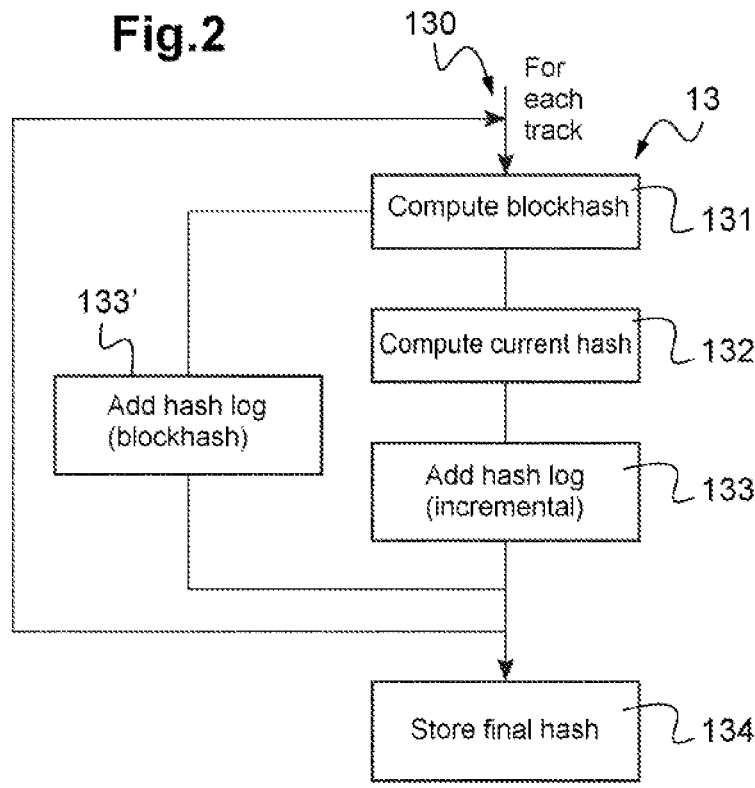
FIG. 2 is a detailed flowchart of a step of creating a security key according to the embodiment of FIG. 1.

Method 1, with reference to FIGS. 1 and 2, comprises a succession of steps associated with a user interface.

The computer-implemented method is also referred to in the rest of the description as an application or computer program.

Thus, to create a new report, the method requires, in a first step, a secure connection for the user.

In this embodiment, the connection is made by way of authentication combining an individual identifier, such as an email address, a telephone number, registration and a password or a single-use code composed of several alphanumeric characters, communicated by message.

For those users with an individual account, the account is stored in a database and is further associated with a unique identification number. Some users are attached to an account of a legal entity (company, agency, etc.) and therefore do not have an individual account.

When a user connects to make a report, they authenticate themself, choose the form corresponding to the core business sought (such as rental, insurance, conveyance of property, etc.) or allocated to the legal entity to which they are attached, and/or to the type of property to be inspected (motor vehicle, boat, apartment, etc.).

Based on these data, the method provides the user with an information entry form.

This form, also called a model or template, is a document comprising predefined fields to be filled in by the user.

Although the nature of the data collected differs depending on the type of inspection and customer needs, the forms are generally divided into sections containing fields to be completed, relating, respectively:

To the persons concerned/signatories. Here the fields to be filled in include last name and first name, company to which they are attached, function, telephone number, email, etc.

To the property subject to the inspection. This is for providing the property references: brand/model, registration, unique identification number (VIN), type and address for real estate;

To the guided photos (also called the photoscan) of the property which are intended to provide visual evidence of the condition of the property;

Freely taken photos intended to provide additional visual information to the extent that the user deems it necessary, on the condition of the property;

To the signing of the report by the one or more initiating persons and/or persons concerned.

Thus, when the user completes the form, they enter data acquired by way of the method, each datum being associated with a predefined field of the form.

The objective of the invention is to make it possible to certify that the information contained in the final report actually corresponds to the data entered by the initiator of the report, and to the photos of the property taken using the computer-implemented method, and that they have not been modified by an unauthorized person either during or after preparation of the inventory.

In other words, it is therefore a question of guaranteeing the integrity of the data in the report both during the preparation of the inventory and after the generation of the report.

A number of security means have been put in place, the combination of which results in a method for securing data/information in the sense of preserving their integrity.

To that end, a number of security elements have been implemented.

When a user connects to the application to create a report, they perform a number of actions such as choosing a form template, filling in the fields thereof, taking photos, and signing the report.

Each of their actions is acquired 11 by the method 1 in the form of acquisition data, which are recorded by the method.

Thus, the method 1 comprises a step 11 of acquiring a plurality of data entered by a user, each acquired datum corresponding to information in said document.

Since these data are entered one after the other by the user, the set of successive acquisitions is called the entry log.

The method 1 for this purpose implements a step 12 of creating an entry log forming a chronological sequence of data entered by said user.

The log thus chronologically lists all of the actions that led to the generation of the final report and makes it possible to track the history of the report.

The log, and the other logs according to the invention, may be stored in the form of a file, in a database or in any other suitable digital format.

Step 12 of creating the log may be performed in parallel with acquisition step 11, in the sense that each time a datum is entered by the user and acquired 11 by the method, it is added 12 to the log in real time.

In particular, in this embodiment of the invention, after each addition of a datum to the log in step 12 of creating the log, the log is encrypted and saved locally on the device implementing the method.

The encryption of the log may be performed by any known encryption method suitable for protecting a data log and for being saved in a file stored locally, for example on a memory storage element of the device, such as a hard disk or a flash memory.

Any encryption algorithm may be implemented, such as the Advanced Encryption Standard (AES), Data Encryption Standard (DES) or the Rivest-Shamir-Adleman (RSA) algorithm, provided that the method is suitable for encrypting the log regularly before storing it locally.

The encrypted log file is temporarily stored locally on the device implementing the method, such as a mobile device, smartphone or tablet, so as to be able to operate even in the absence of a remote communication network such as a Wi-Fi or GSM network.

However, the local storage is only temporary, until the return of a communication network allowing the transmission of the encrypted log file to a secure remote server.

Permanent storage of log files takes place on a remote server and local files are deleted after transfer to the remote server.

Thus, the log is created, encrypted and stored, in real time on each entry, which ensures high security and optimal tracking of the user's actions, even in the event of untimely closure of the software, while guaranteeing that the log file is not modified fraudulently.

In addition to the data entered by the user actively, such as connection actions, filling in fields, taking photos, importing contacts, or accepting contractual conditions, other events may be acquired in the log. Reference is then made to events automatically captured by the system, on a regular or occasional basis, such as the identification of the user or the identification and geographical location of the device creating the report.

All of these constituent elements of the final report, entries and automatic acquisitions, form elements called constituent tracks of the report, and more simply tracks.

Each track is thus an element added to the log, the set of tracks forming the final log for creating the report.

Thus, by replaying the entire final log from the first track to the last track, it is possible to obtain the report as created once again.

However, one of the objectives of the invention is precisely to be able to certify that the log has not been modified a posteriori, whether it is an intentional, for example malicious, modification, or corrupted data.

Thus, by way of example for a motor vehicle report, the method may log the following tracks:

A date and time of completion of the track;

The identification of the user behind the tracked event;

Identification of the type of event;

The geographical location of the event (geographical location of the device used to carry out the inventory);

A unique evidence identifier.

In the case of a vehicle inventory, for example, the fields below may be listed as tracks.

Identification of the operating system installed in the computer device used to produce the report (IOS, Android, etc.)

Last name and first name of the user reference number used to identify the user;

public identifier, such as email address;

geographical location of the device used to produce the inventory;

geographical parameters recorded by the system corresponding to the altitude geographical parameters recorded by the system corresponding to the latitude;

geographical parameters recorded by the system corresponding to the longitude;

timestamp of entries or regular timestamp

Place in the form being edited

Form template section, if the form template is divided into distinct sub-parts vehicle registration number;

old value in the case of replacement or correction of an incorrect previous entry;

photo of the front of the vehicle;

photo of the front left side of the vehicle;

photo of the front right side of the vehicle;

photo of the rear left side of the vehicle;

photo of the rear right side of the vehicle;

photo of the rear of the vehicle;

photos freely taken by the user;

In addition, among automatically acquired events, the following tracks may be logged:

starting a report from a model;

reopening of a pending report;

recovering a report and/or a log after a crash (bug or other incident having interrupted the inventory in progress);

starting a profile import;

ending a profile import;

starting a report import from the directory;

ending the report import from the directory;

finalizing a step and the user requesting to move on to the next step in making the report;

the user prematurely terminates the preparation of the report while saving report status, for example by clicking on "exit and save" in a user interface;

The user accepts contractual conditions, for example by ticking an appropriate box.

More generally, the method also logs the loading of all data obtained dynamically, whether it be internal data loaded after launching the method or external data acquired, for example, via an application programming interface (API).

Such dynamically loaded data may, for example, comprise data relating to a fleet comprising all of the property, vehicles in this embodiment, recorded in the database and associated with the user, either because they had to make reports relating to these items of property, or because they added them through a dedicated functionality of the software associated with the method according to the invention.

In this case, the fleet import therefore relates to the automatic selection of property that has already been recorded.

With such an import, when the user selects the property, all of the related information is automatically displayed and fills in the fields of the form provided for this purpose (e.g. brand, VIN, registration, etc.). This automatic filling action is also logged by the method.

In order to constitute a cryptographic proof of the authenticity of the report, the method then implements a step 13 of computing a final security key on the basis of the data entered by the user and the data acquired automatically by the method.

For each track recorded in the log, a unique hash is computed 131 using a hash function; in other words, a fingerprint for this datum is computed.

A hash function is a function that computes a unique fingerprint, also called a signature, digest, or hash, from the datum or data provided.

The hash function, sometimes called the hashing function, makes it possible to obtain a digest of a text, that is to say a rather short sequence of characters representing the text that it condenses.

The hash function is such that it associates one and only one hash with a plaintext. Therefore, the slightest modification of the document leads to the modification of its hash.

However, it is a one-way function, so it is impossible to recover the original message from the digest. If there is a way to recover the plaintext message from the digest, the hash function is referred to as a "trapdoor" hash.

The length of the hash must always be the same, regardless of the length of the input data, although the invention could be adapted to work with hashes of variable lengths.

It is not possible to recover the original data from the hashes: Hash functions only work in one direction.

In this embodiment of the invention, the hash function is a SHA-256 function. However, the invention is not limited to a single hash function, many alternatives of which are known to a person skilled in the art.

The transformation 131 of a track by the hash function gives a fingerprint or hash, called a blockhash. In other words, the fingerprint of a track in the log is called the blockhash.

From the hash of each track, a log 133, 133' of security keys is created.

More precisely in this embodiment of the invention, two logs 133, 133' are created, firstly a log 133' forming a sequence of blockhashes, and secondly an incremental hash log 133.

Specifically, each hash, which in this embodiment is in the form of a sequence of 64 characters, is associated 132, by computing with the hash function, with the hash of the next track in the log, creating a new hash, and so on until the last track. In other words, a computed hash 132 is obtained incrementally with the preceding hashes computed successively, called the current hash, or the incremental hash.

Thus, the incremental hash log 133 comprises a succession of hashes, each formed from the combination of a track associated with the preceding hash of the log 133, in other words with the preceding incremental hash.

However, although the creation of the two key logs 133, 133' is preferred, the invention may also be implemented with the creation of only one of the two logs 133, 133'.

In the case of photos, the hash of each photo in the inventory report is also computed using a hash function, here SHA-1, and takes the form of a sequence of 40 characters.

The evidence of the photos alone may thus, according to one implementation of the invention, be separated from the other tracked elements.

In addition, the photos may also be stored in a distinct log.

However, photo metadata may be added to the main log to strengthen the ability to authenticate the data in the report.

The last computed incremental hash, which corresponds to the hash of the last track acquired before the end of editing the report which is computed with the preceding incremental hash, corresponds to the final security key.

The final hash of the log, also called the final security key, is then stored 134 in a blockchain, in this embodiment in the public bitcoin blockchain.

This process makes it possible to obtain irrefutable proof of the existence of the data contained in the log and, by extension, in the inventory report generated.

Next, the method moves on to a step 15 of digitally publishing and/or physically printing the final report.

In this embodiment of the invention, the report is published in an encapsulated file format, here PDF, but any other way of publishing the report may be implemented by a person skilled in the art.

In particular, the published document is signed, via an electronic seal affixed by method 1, so as to certify the creation of this file via this method 1, for example via a seal based on a digital certificate issued by an accredited certification authority.

The invention also relates to a method 3 for verifying the authenticity of a document prepared by means of said creation method 1 above.

Figure 3:
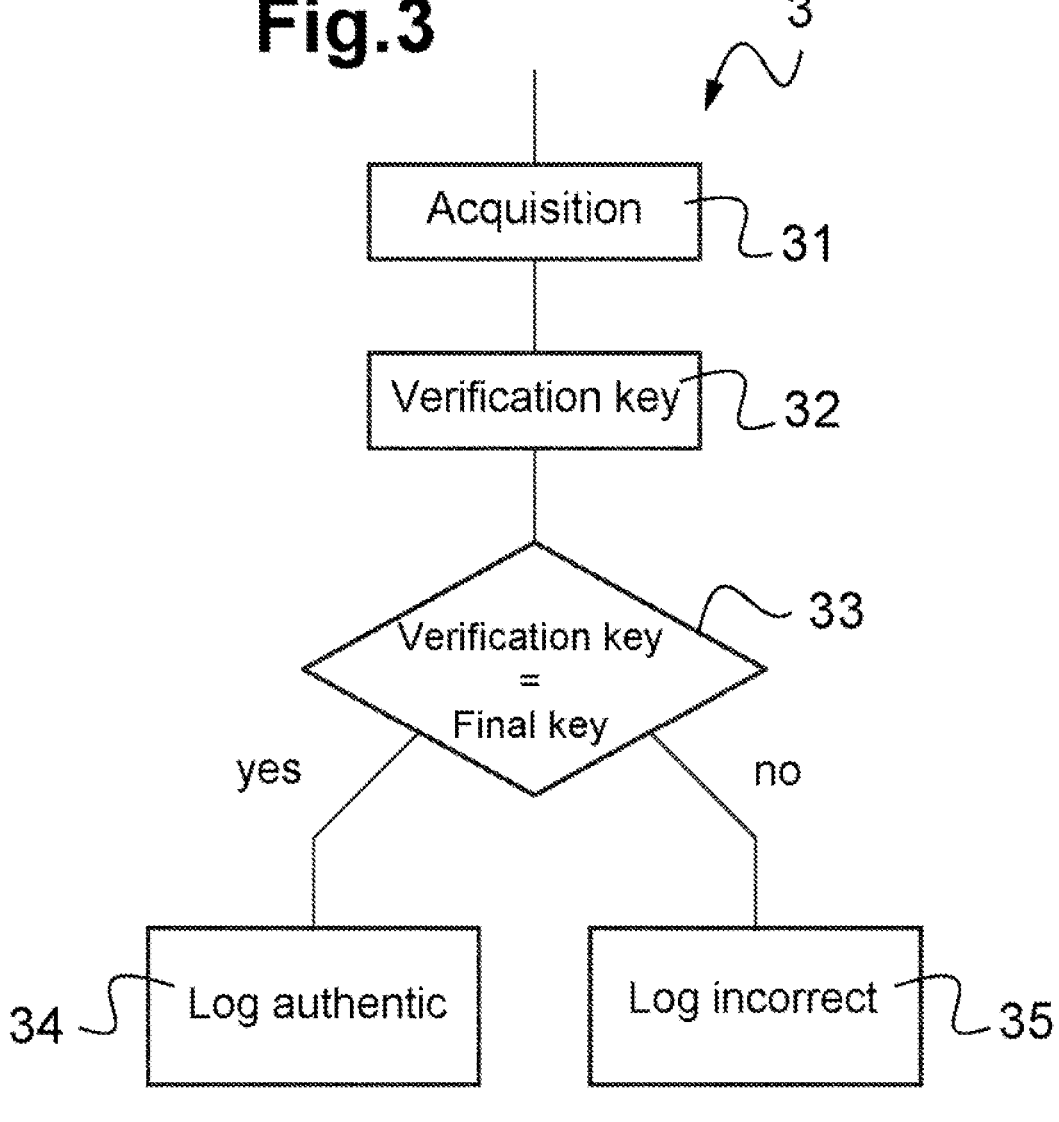
FIG. 3 is a flowchart of a verification method according to one embodiment of the invention.

Method 3, with reference to FIG. 3, comprises a step 31 of acquiring the stored data, an associated security key and an entry log, associated with the report to be verified.

The acquired elements are thus acquired via the method on a platform, for example a remote and private server.

From the acquired data 31, a second security key, called verification key, is computed 32 using the same hashing method as for creating the report, from the data in the associated entry log and said stored data.

Once the verification key has been computed, using the same computing method as for creation method 1, it is compared 33 with the final security key.

The final security key was acquired in acquisition step 31 or in another acquisition step, for example by acquiring it over a blockchain, such as the public bitcoin blockchain.

If it is found in the comparison 33 between the associated security key and the second security key that the two keys are identical, then the document is authentic 34.

However, if the two keys are different, then it is established that the log is not in accordance 35 with the associated report.

Thus, the two methods 1 and 3 allow reports to be created and verified securely.

In particular, the locking of the tracks in the blockchain gives rise to the generation of an anchoring receipt or proof receipt, which is a file containing all of the information required to verify the existence of the data (tracks) contained in a log, and their timestamp. The proof format used in this embodiment of the invention is Chainpoint 1.0.

Such a file thus attests to the recording of the final security key in the blockchain; the key is recorded in the blockchain with the aim of ensuring its integrity.

The proof receipt may thus be communicated in the event of litigation or pre-litigation, at the request of any person interested in verifying the data in a log. The recipient may thus carry out verification in two stages:

They will first be able to verify the existence of the anchoring of the hash of the data in the blockchain. To do this, they will use the proof receipt and perform a search on a dedicated website;

In a second step, they will recompute the hash of the data using the method according to the invention and will compare the hash obtained with the hash locked in the blockchain.

The invention claimed is:

1. A computer-implemented method for preparing a property transfer document, comprising:

acquiring a plurality of data entered one after the other by a user, each acquired datum corresponding to an item of information on said document, the acquired data including at least information that identifies the property and at least information related to at least one condition of the property;

creating an entry log forming a chronological sequence of the entry of the data by said user;

an incremental security key computing step in which a first security key is computed during the acquisition of a first datum entered by said user and, for each acquisition of a subsequent datum entered by the user, a subsequent security key is computed on the basis of said entered datum and of the preceding security key until a final security key is computed;

storing said acquired data, said entry log and said security keys, said security keys computed in the incremental security key computing step being stored in a sequential manner so as to form an incremental security key log;

creating the property transfer document based on the acquired data, which includes at least the acquired data; and digitally publishing the property transfer document.

2. The computer-implemented method as claimed in claim 1, wherein the method comprises, after the creating the entry step, constituting a first security key log such that, for each entry in the entry log, the first security key log comprises a key computed on the basis of said entry.

3. The computer-implemented method as claimed in claim 1, wherein at least said final security key is stored in a decentralized manner, in particular in a blockchain.

4. The computer-implemented method as claimed in claim 1, wherein the acquiring-comprises the acquisition of at least one item of multimedia content associated with a distinct fingerprint computed by way of a fingerprint computation distinct from the other acquired data and/or stored in a multimedia content fingerprint log distinct from the other acquired data.

5. A computer-implemented authentication method for verifying the authenticity of a document prepared by, acquiring a plurality of data entered one after the other by a user, each acquired datum corresponding to an item of information on said document, and the acquired data including at least information that identifies the property and at least information related to at least one condition of the property;

creating an entry log forming a chronological sequence of the entry of the data by said user;

an incremental security key computing step in which a first key is computed during the acquisition of a first datum entered by said user and, for each acquisition of a subsequent datum entered by the user, a subsequent security key is computed on the basis of said entered datum and of the preceding security key until a final security key is computed;

storing said entry log;

storing said acquired data;

storing said security keys, said security keys computed in the incremental security key computing step being stored in a sequential manner so as to form an incremental security key log;

creating the property transfer document based on the acquired data, which includes at least the acquired data; and digitally publishing a property transfer document according to the acquired data, the authentication method comprising:

acquiring said stored acquired data, said stored security keys, and said stored entry log;

computing a final authentication security key on the basis of said stored entry log and of said stored acquired data, the final authentication security key being computed by an incremental authentication security key computing step, wherein a first authentication key is computed based on a first stored datum, and for each subsequent stored datum, a new authentication key is computed based on said datum and the immediately preceding authentication key, until the final authentication security key is obtained;

comparing said stored final security key and the final authentication security key; and verifying that said prepared document is authentic if the stored final security key and the final authentication security key are identical.

6. The computer-implemented method as claimed in claim 4, wherein the at least one item of multimedia content is a digital image.

7. The computer-implemented method as claimed in claim 4, wherein the at least one item of multimedia content is a digital video.

8. A data-processing device comprising a computer that is configured to implement the steps of a computer-implemented method for preparing a property transfer document or a computer-implemented authentication method for verifying the authenticity of a document prepared by a preparation method, or a computer product comprising a non-transitory computer-readable medium storing a computer program comprising instructions which, when executed by a computer, result in the computer implementing the steps of the computer-implemented method for preparing a property transfer document or the computer-implemented authentication method for verifying the authenticity of a document prepared by the preparation method, the computer-implemented method for preparing a property transfer document, comprising:

acquiring a plurality of data entered one after the other by a user, each acquired datum corresponding to an item of information on said document, the acquired data including at least information that identifies the property and at least information related to at least one condition of the property;

creating an entry log forming a chronological sequence of the entry of the data by said user;

an incremental security key computing step in which a first security key is computed during the acquisition of a first datum entered by said user and, for each acquisition of a subsequent datum entered by the user, a subsequent security key is computed on the basis of said entered datum and of the preceding security key until a final security key is computed;

creating the property transfer document based on the acquired data, which includes at least the acquired data; and digitally publishing the property transfer document, and the authentication method comprising:

acquiring said acquired data, said security keys, and said entry log;

computing a final authentication security key on the basis of said entry log and of said acquired data, the final authentication security key being computed by an incremental authentication security key computing step, wherein a first authentication key is computed based on a first stored datum, and for each subsequent stored datum, a new authentication key is computed based on said datum and the immediately preceding authentication key, until the final authentication security key is obtained;

comparing said stored final security key and the final authentication security key; and verifying that said prepared document is authentic if the stored final security key and the final authentication security key are identical.

* * * * *